(12) United States Patent
Struve et al.

(10) Patent No.: US 12,570,251 B2
(45) Date of Patent: Mar. 10, 2026

(54) ANTI-LOCK BRAKING UNIT FOR A HYDRAULIC BRAKING SYSTEM, PARTICULARLY OF A BICYCLE

(71) Applicant: RAICAM DRIVELINE S.R.L., Mondovi' (IT)

(72) Inventors: Benjamin Chetwood Struve, Kenilworth (GB); Sandro Bonardo, Peveragno (IT); Andrea Canestrari, San Costanzo (IT); Daniele Canova, Ceva (IT)

(73) Assignee: Raicam Driveline Srl, Mondovì (IT)

( * ) Notice: Subject to any disclaimer, the term of this patent is extended or adjusted under 35 U.S.C. 154(b) by 485 days.

(21) Appl. No.: 18/013,163

(22) PCT Filed: Jun. 24, 2021

(86) PCT No.: PCT/EP2021/067420
§ 371 (c)(1),
(2) Date: Dec. 27, 2022

(87) PCT Pub. No.: WO2021/260149
PCT Pub. Date: Dec. 30, 2021

(65) Prior Publication Data
US 2023/0234544 A1      Jul. 27, 2023

(30) Foreign Application Priority Data
Jun. 25, 2020    (IT) .................... IT102020000015367

(51) Int. Cl.
B60T 8/17      (2006.01)
B60T 8/32      (2006.01)
B62L 3/02      (2006.01)
(52) U.S. Cl.
CPC .......... B60T 8/1706 (2013.01); B60T 8/3225 (2013.01); B62L 3/023 (2013.01)

(58) Field of Classification Search
CPC ....... B60T 8/1706; B60T 8/3225; B62L 3/023
(Continued)

(56) References Cited

U.S. PATENT DOCUMENTS 3,995,652 A    12/1976    Belart et al.
4,435,768 A    3/1984    Arikawa
(Continued)

FOREIGN PATENT DOCUMENTS

DE          10158382 A1    6/2003
DE      102012222058 A1    6/2014
(Continued)

OTHER PUBLICATIONS

International Search Report, issued in PCT/EP2021/067420, mailed Sep. 8, 2021, Rijswijk, NL.
(Continued)

*Primary Examiner* — Christopher P Schwartz
(74) *Attorney, Agent, or Firm* — Cittone Demers & Ameri LLP; Henry J. Cittone

(57) ABSTRACT

An anti-lock braking unit is provided which has a single actuating solenoid acting on a piston of an associated valve unit. The actuating solenoid moves the piston within a primary hydraulic chamber in fluid communication with a brake calliper. A movement of the piston closes a bypass passage formed within the valve unit, that connects a master cylinder to the brake calliper. By closing the bypass passage, the build-up of pressure acting on the calliper is stopped. Simultaneously, the movement of the piston opens an outflow passage within the valve unit, allowing a brake fluid to vent from the primary hydraulic chamber into an expansion chamber. The expansion chamber provides an increased volume for brake fluid contained between the valve unit and the brake calliper, thereby decreasing pressure of the brake fluid acting on the calliper.

10 Claims, 10 Drawing Sheets

(58) Field of Classification Search
USPC ........................................... 303/119.1, 119.2
See application file for complete search history.

(56) References Cited

U.S. PATENT DOCUMENTS

| | | | | |
|---|---|---|---|---|
| 5,971,501 | A * | 10/1999 | Hosoya | ................... B60T 8/365 |
| | | | | 303/119.2 |
| 6,364,430 | B1 * | 4/2002 | Park | ........................ B60T 8/363 |
| | | | | 303/119.2 |
| 6,588,857 | B2 * | 7/2003 | Sim | ........................ B60T 8/363 |
| | | | | 303/119.2 |
| 2015/0123460 | A1 * | 5/2015 | Prescott | ................. B60T 8/361 |
| | | | | 251/30.02 |
| 2015/0344009 | A1 | 12/2015 | Hagspiel et al. | |
| 2024/0092332 | A1 * | 3/2024 | Bonardo | .............. B60T 15/028 |
| 2024/0336243 | A1 * | 10/2024 | Bonardo | ................. B60T 8/366 |

FOREIGN PATENT DOCUMENTS

| | | | |
|---|---|---|---|
| EP | 0624498 | A2 | 11/1994 |
| EP | 3392105 | A2 | 10/2018 |

OTHER PUBLICATIONS

Written Opinion, issued in PCT/EP2021/067420, mailed Sep. 8, 2021, Rijswijk, NL.

* cited by examiner

ANTI-LOCK BRAKING UNIT FOR A HYDRAULIC BRAKING SYSTEM, PARTICULARLY OF A BICYCLE

CROSS-REFERENCE TO RELATED APPLICATIONS

This application is a National Phase Application of PCT International Application No. PCT/EP2021/067420, having an International Filing Date of Jun. 24, 2021, claiming priority to Italian Patent Application No. 102020000015367, filed Jun. 25, 2020, the disclosures of each of which are hereby incorporated by reference in their entireties.

TECHNICAL FIELD

The present invention concerns a valve system for controlling the anti-lock function of a wheel, particularly, but not exclusively, the wheel of a bicycle.

BACKGROUND ART

Anti-lock braking systems (ABS) have been installed on bicycles having hydraulic brakes, to prevent skidding, or uncontrolled sliding, by reducing the effects of stopping suddenly. In these systems, a master cylinder actuated by a hand lever activates a brake calliper through hydraulic pipes. The brake calliper converts fluid pressure into normal force between brake friction pads and the brake disc. An ABS unit includes a hydraulic valve to control the flow and pressure of the brake fluid transferred to the brake calliper. Operation of the ABS unit is controlled by an ECU (Electronic Control Unit) in response to signals from speed sensors mounted on the wheels of the bicycle. When the ECU detects a condition indicative of impending lock of a wheel, it actuates the valve to reduce hydraulic pressure to the brake at the affected wheel, thus reducing the braking force on that wheel; the wheel then is allowed to rotate faster. This process is repeated continuously during braking, several times per second, preventing the bicycle from skidding.

DE 101 58 382 A1 discloses an anti-lock brake system for bicycles, comprising hydraulic master and slave cylinders integrated into a hydraulic actuator that forms a compact hydraulically closed unit with outlet and non-return valves and a low pressure hydraulic liquid tank. The system includes also an electronic controller, at least one wheel brake, at least one speed sensor and a hydraulic actuator with a low pressure hydraulic liquid tank connected to a discharge valve and an isolating valve. A non-return valve is connected in parallel with the discharge valve and a hydraulic slave cylinder is connected downstream of the isolating and discharge valves.

EP 3 392 105 A2 (corresponding to WO 2017/115171 A2) discloses a hydraulic brake system for a bicycle, including two electrically operated valve units. Each valve unit is operated separately from the other, by a respective electric actuator. One valve unit is used for locking the brake fluid between the master cylinder and the brake callipers, and a second valve unit is used for opening a parallel channel which hydraulically connects the brake calliper with an accumulator. The two electric actuators are energized individually by the ECU in a redetermined sequence. The two valve units are located on parallel branches of a hydraulic circuit which connects a master cylinder actuated by a hand lever, and a brake calliper. During normal braking, a first valve unit is open, allowing direct fluid communication between the master cylinder and the brake calliper, whist the second valve unit is closed. Under hard braking conditions, in an impending lock of a wheel, a first electric actuator closes the first valve unit, thereby stopping the inlet pressure from the hand lever, whereby the pressure is locked from the first valve unit to the calliper, preventing further build-up of pressure acting on the calliper. A second electric actuator opens the second valve, allowing the pressure to vent into the accumulator, which is located upstream of the second valve in the parallel channel. As a result, the pressure on the calliper is reduced, unlocking the brake.

Other known ABS systems comprise a valve unit including a piston which is mounted within the hydraulic line. The piston is controlled by an electric motor that moves the piston backwards and forwards in order to change the volume in the hydraulic line and therefore modulate the pressure in the braking circuit.

SUMMARY OF THE INVENTION

Against the foregoing background, it is a primary object of the present invention to provide an improved ABS system for a bicycle having constructional and cost saving advantages.

Another object is to provide a lightweight and compact ABS system. A specific object of the present invention is to use a single valve unit which requires only a single electrical solenoid to be energized in order to be able to control the braking locking and unlocking sequence, as necessary.

It is an object of the present invention to provide a different type of single valve which requires only one single electrical actuator. This offers potential benefits in terms of electrical consumption; also, reduction in complexity, cost and weight of both the mechanical and electrical/electronic components.

According to an aspect, the present invention provides an anti-lock braking unit for a hydraulic braking system, particularly of a bicycle. Preferred embodiments are also described.

In summary, an anti-lock braking unit comprises a single actuating solenoid acting on an associated piston of a single, associated valve unit. The solenoid moves the piston within a primary chamber which is in fluid communication with the brake calliper. The movement the piston closes a bypass passage, formed within the valve unit, that normally connects the master cylinder to the brake calliper. By closing the bypass passage, the build-up of pressure acting on the calliper is stopped. Simultaneously, the same actuating movement of the piston opens an outflow passage within the valve unit, allowing the brake fluid to vent from the primary chamber into an expansion chamber. The expansion chamber provides an increased volume for the brake fluid contained between the valve unit and the brake calliper, thereby decreasing the pressure of the brake fluid acting on the calliper.

According to another aspect, the present invention provides a valve unit.

According to a further aspect, the present invention provides an anti-lock braking system including an anti-lock braking unit described and claimed herein.

According to a still further aspect, the invention refers to a vehicle, such as a bicycle, comprising the above-mentioned anti-lock braking system.

BRIEF DESCRIPTION OF THE DRAWINGS

In order that the present invention may be well understood there will now be described a few preferred embodiments thereof, given by way of example, reference being made to the accompanying drawings, in which.

DETAILED DESCRIPTION OF THE INVENTION

Figure 1:
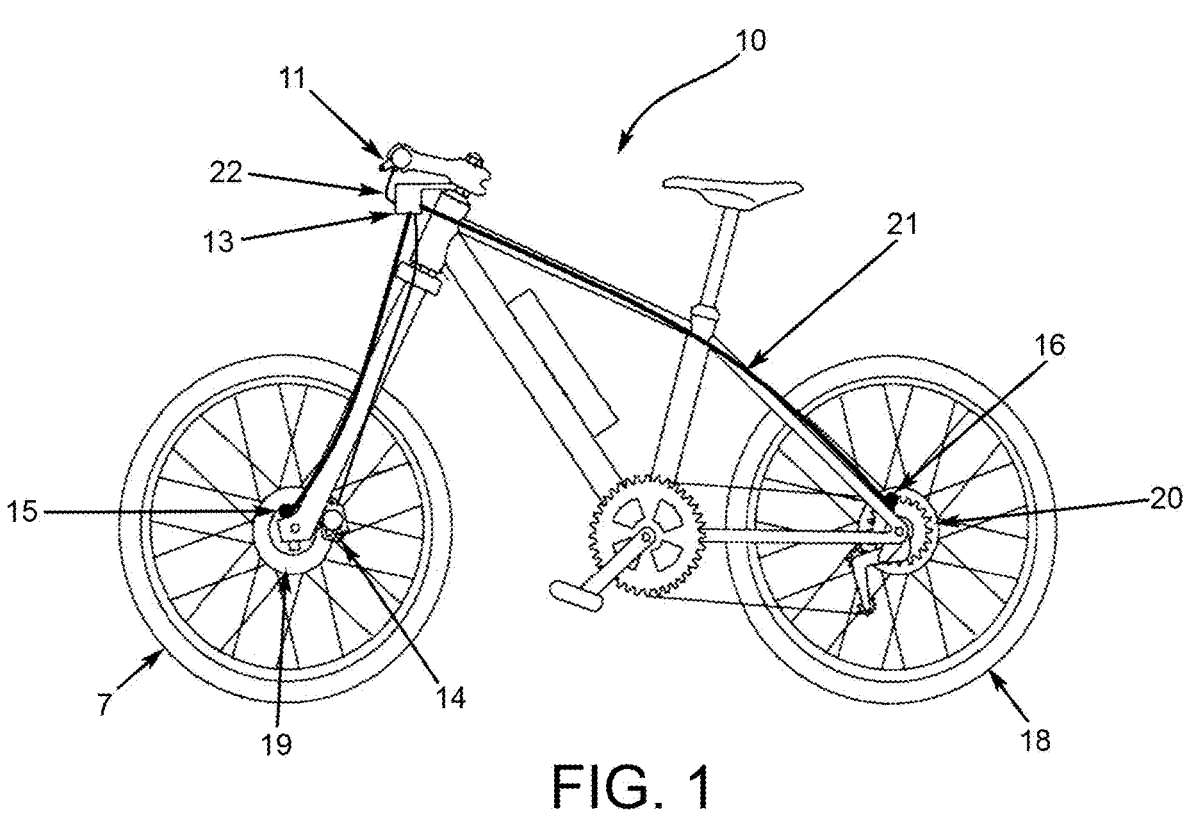
FIG. 1 is a schematic view of the main components within the ABS system on a bicycle.

Before an embodiment of the invention is explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

Referring initially to FIG. 1, the present invention is applicable, for example, to a bicycle 10 having hydraulic brakes and an anti-lock braking system. A hand lever 11 is associated with a master cylinder 12, which converts force from the rider's hand into fluid pressure. An ABS unit 13 controls the flow and pressure of hydraulic fluid to a front wheel brake calliper 14, in response to signals from speed sensors 15, 16. A front wheel speed sensor 15 measures the rotating speed of the front wheel 7, for example by sensing the movement of slots in the adjacent brake disc 19. A rear wheel speed sensor 16 measures the rotating speed of the rear wheel 18, for example by sensing the movement of slots in the adjacent brake disc 20. Sensor wiring 21 relays speed signals from the speed sensors to the ABS unit 13. Hydraulic pipes 22 transfer fluid under pressure between the master cylinder, the ABS unit and the brake calliper. The brake calliper converts fluid pressure into normal force between brake friction pads and the brake disc. The calliper also reacts against the sliding force at the brake pads, hence generating a braking torque at the brake disc.

Although this disclosure specifically shows an exemplary embodiment providing anti-skid control of a front wheel of a bicycle, the present system may equally be applicable to a rear wheel of a bicycle.

Figure 2:
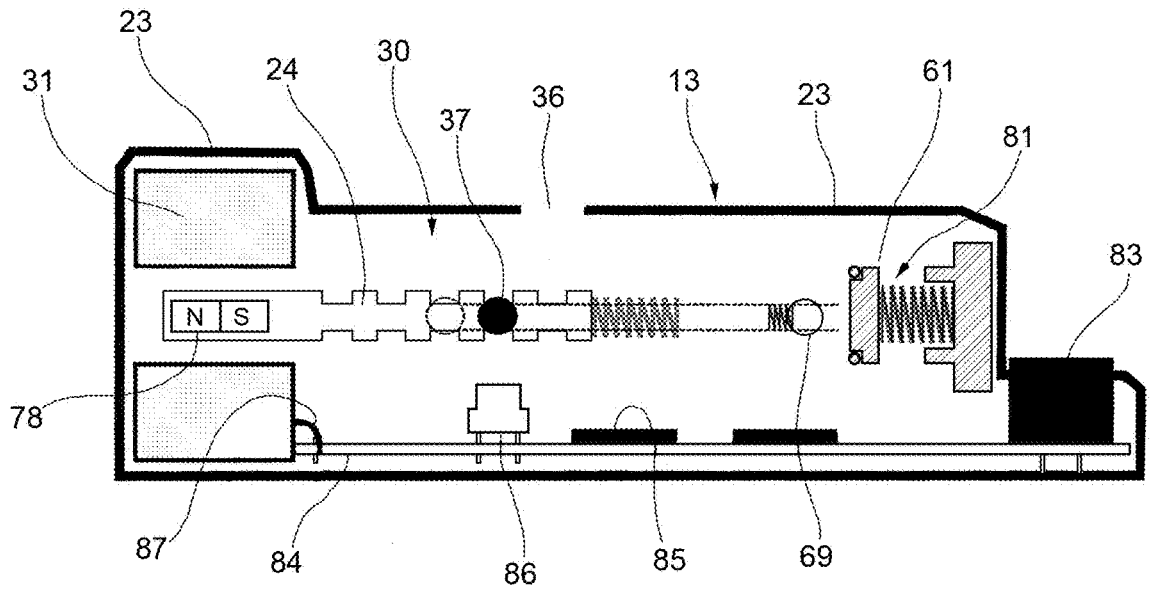
FIG. 2 is a schematic cross-sectional view of an ABS unit and its components.

Schematically depicted in FIG. 2 are the main components of an ABS unit 13. The general operation of an ABS unit will first be described with reference to FIGS. 2 to 6. The constructional and functional features of a hydraulic valve unit are described with reference to FIGS. 7 to 13.

The ABS unit 13 comprises an enclosure 23 including a hydraulic valve unit 30 for controlling the flow and pressure of the brake fluid transferred to the brake calliper.

The enclosure 23 contains the electronic and mechanical components and provides environmental protection for the internal components. The enclosure may also provide mountings (not shown) which are used to attach the ABS unit securely to the bicycle or e-bike.

The hydraulic housing may enclose a spool valve 24, a check valve 69, an accumulator 81 and a valve body 32 forming chambers and ducts, for example machined in the body 32 of the valve unit. Galleries or ducts may also be machined within the body and the housing to appropriately connect the hydraulic components. Hydraulic connection inlet 37 and outlet 36 ports are also machined within the housing, which allow the hydraulic pipes to the master cylinder and brake calliper to be connected.

The spool valve comprises a sliding piston 40 (shown in detail in FIG. 7) slidably accommodated within the valve body 32. As explained herein after, the longitudinal movement of the piston 40 within the valve body 32 connects the internal ducts and chambers in order to provide the ABS unit's hydraulic function.

The sliding piston has two positions: in a first position or position 0, the hydraulic ducts to the master cylinder and the brake calliper are directly connected, and the duct to the accumulator is closed. In the second position, or position 1, the duct connected to the master cylinder is closed, whilst the ducts connecting the brake calliper to the accumulator are in fluid communication with one another. In an intermediate position in between position 0 and position 1, the connections to all of the ducts are simultaneously closed. The sliding piston is spring loaded into position 0. A magnet or magnetic feature 78 at one end of the spool 24 interacts with a magnetic field generated by an electromagnetic solenoid 31, which when energized forces the valve against its spring into position 1.

A return spring 57 moves the piston 40 into position 0 when there is no electromagnetic force acting on the sliding element. An accumulator 81 comprises a spring-loaded piston 61 enclosing a hydraulic chamber. The accumulator may absorb hydraulic fluid under pressure by deflecting the spring. The volume behind the accumulator piston 61 may be open to atmosphere to allow the piston to move without generating counteracting air pressure.

A check valve 69 may close when pressure in the master cylinder is greater than pressure in the accumulator. The valve opens to allow fluid which is stored in the accumulator cylinder to escape back to the master cylinder, when the master cylinder pressure is lower than the pressure in the accumulator.

The electromagnetic solenoid 31 is energised by an Electronic Control Unit (ECU) comprising: a circuit board 84, a microcontroller 85 attached to the circuit board 84, input and output devices connected to that microprocessor, connections to an external electrical connector 83, a pressure sensor 86, a connection 87 to the electromagnetic solenoid 31, and solid-state switching devices which allow switching of current within the windings of that solenoid. In a preferred embodiment, all the components of ECU unit are included in the enclosure 23 of the ABS unit 13.

A real time control system may be loaded into the flash memory of the microcontroller which controls current within the solenoid and spool valve position. This enables the ABS unit to control the connections between the hydraulic ducts according to the operating objectives of the ABS system.

The solenoid 31 exerts a magnetic force on the sliding valve, moving it from position 0 to position 1. The electromagnetic solenoid's windings may be connected directly to the ECU circuit board 84.

The pressure sensor 86 may be connected via a duct in the hydraulic housing to the brake calliper port (not shown), so that it may measure hydraulic pressure in the brake calliper. The pressure sensor may be connected directly to the ECU circuit board.

An electrical connector 83 allows the ECU circuit board to be connected robustly to a wiring loom, which supplies the circuit board with electrical power and connects the ECU to the speed sensors.

Figures 3, 4:
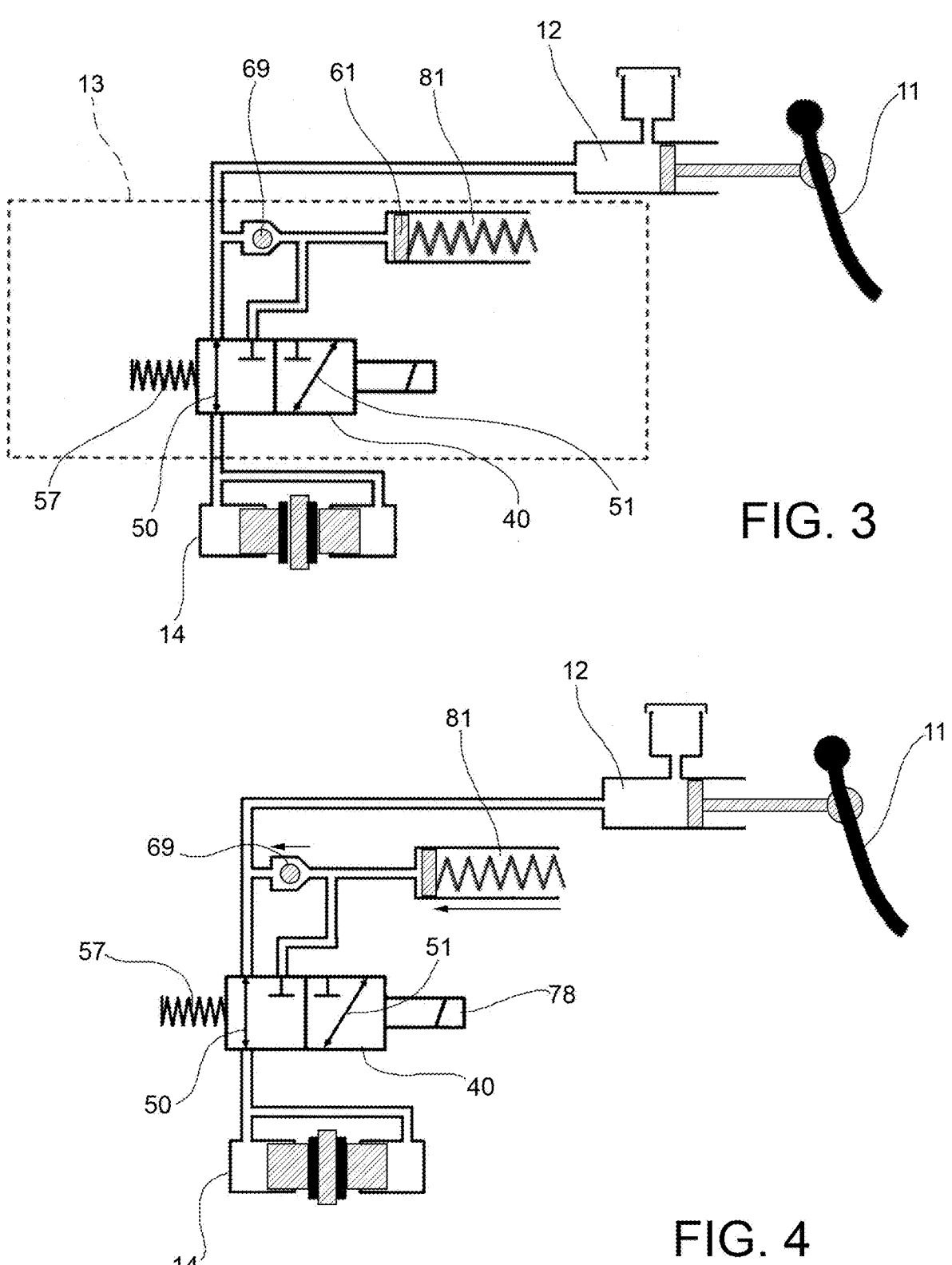
FIG. 3 is a circuit diagram of the hydraulic system.
FIG. 4. is a schematic view of the hydraulic braking system in a state with the brakes off.
Figures 5, 6:
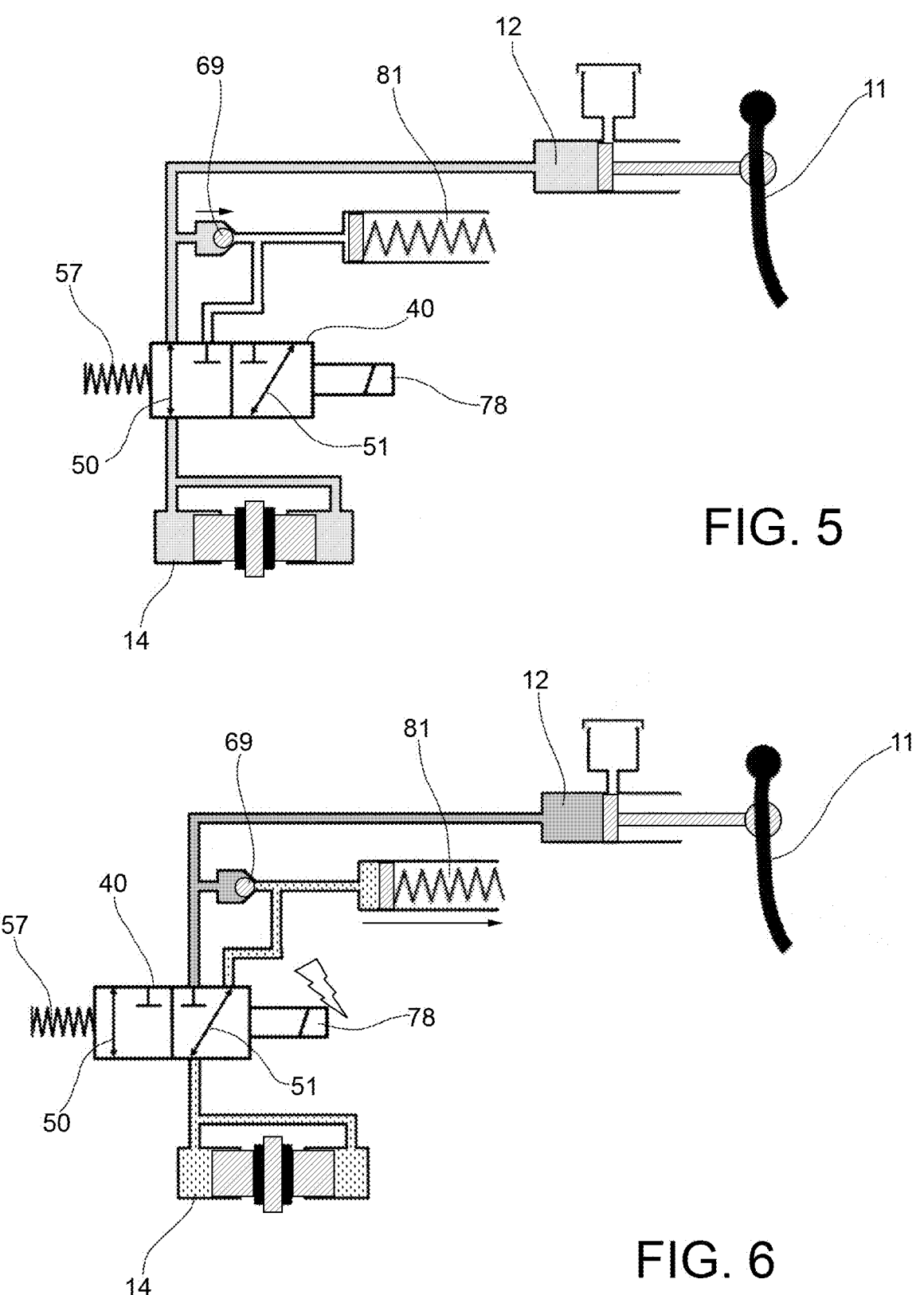
FIG. 5 is a schematic view of the hydraulic braking system during manual braking.
FIG. 6 is a schematic view of the hydraulic braking system in a state with decreased braking pressure.
Figure 7:
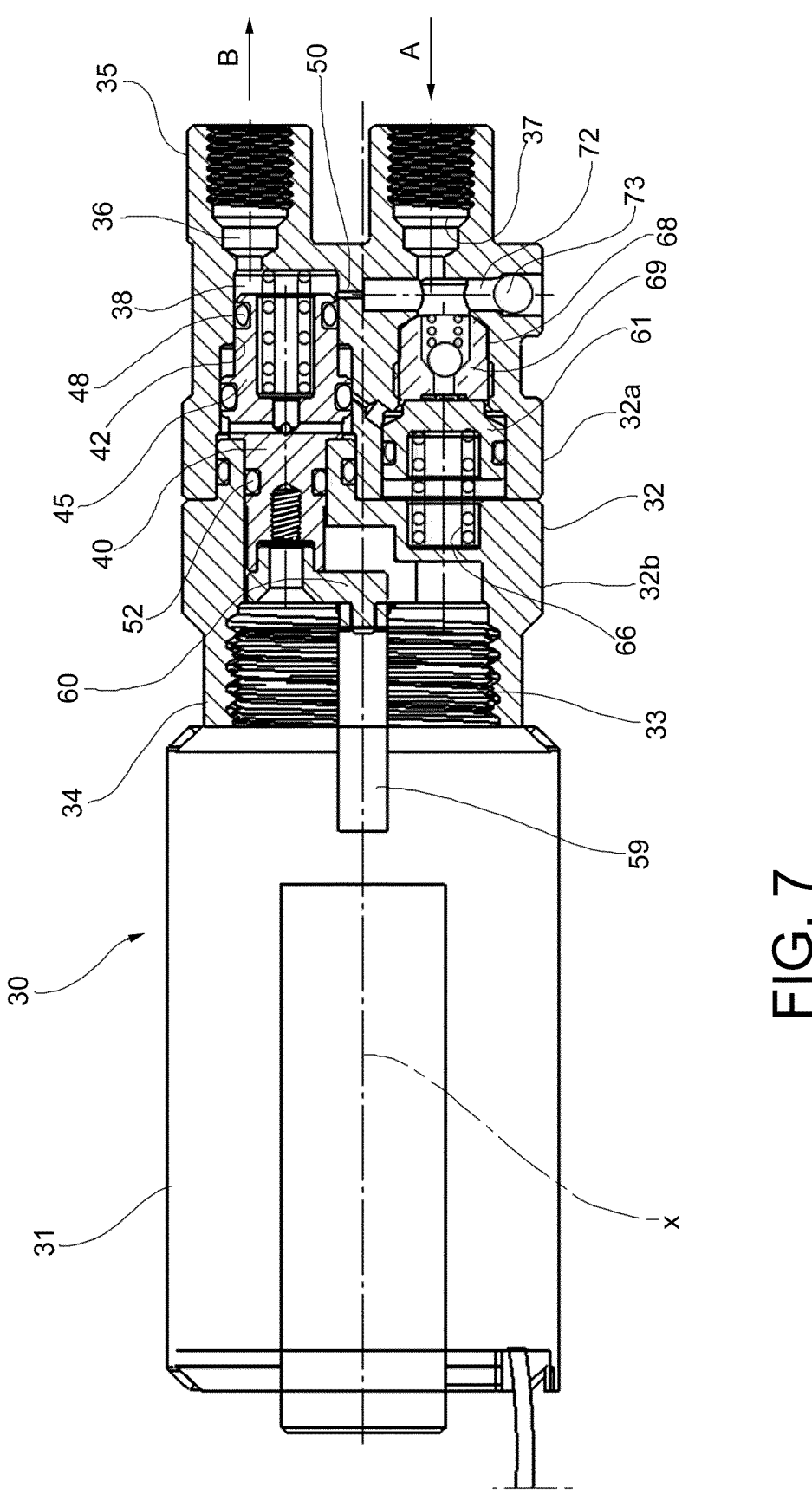
FIGS. 7 to 13 are axial cross-sectional views of a valve unit shown in different operational conditions.
Figure 8:
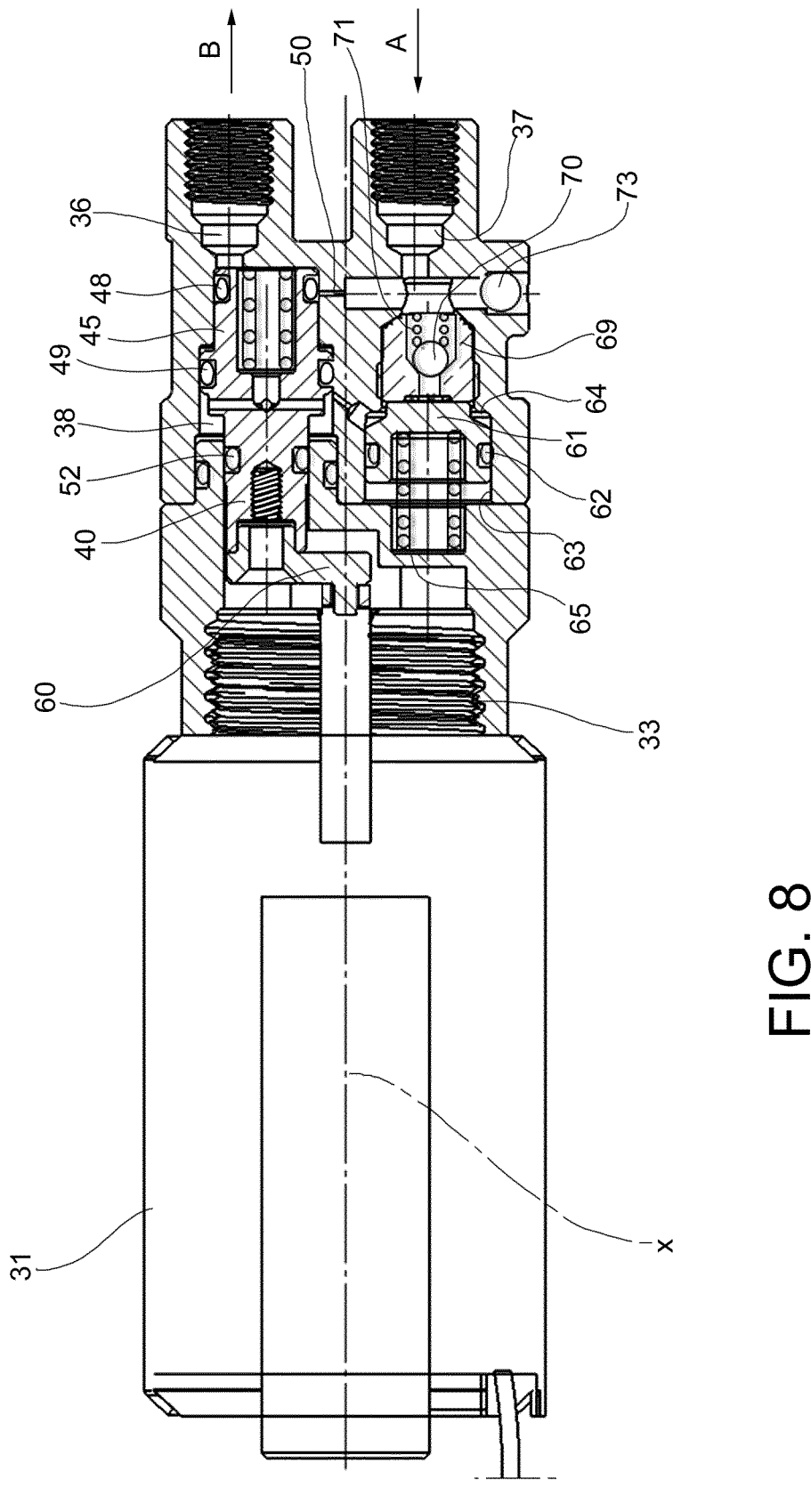
Figure 9:
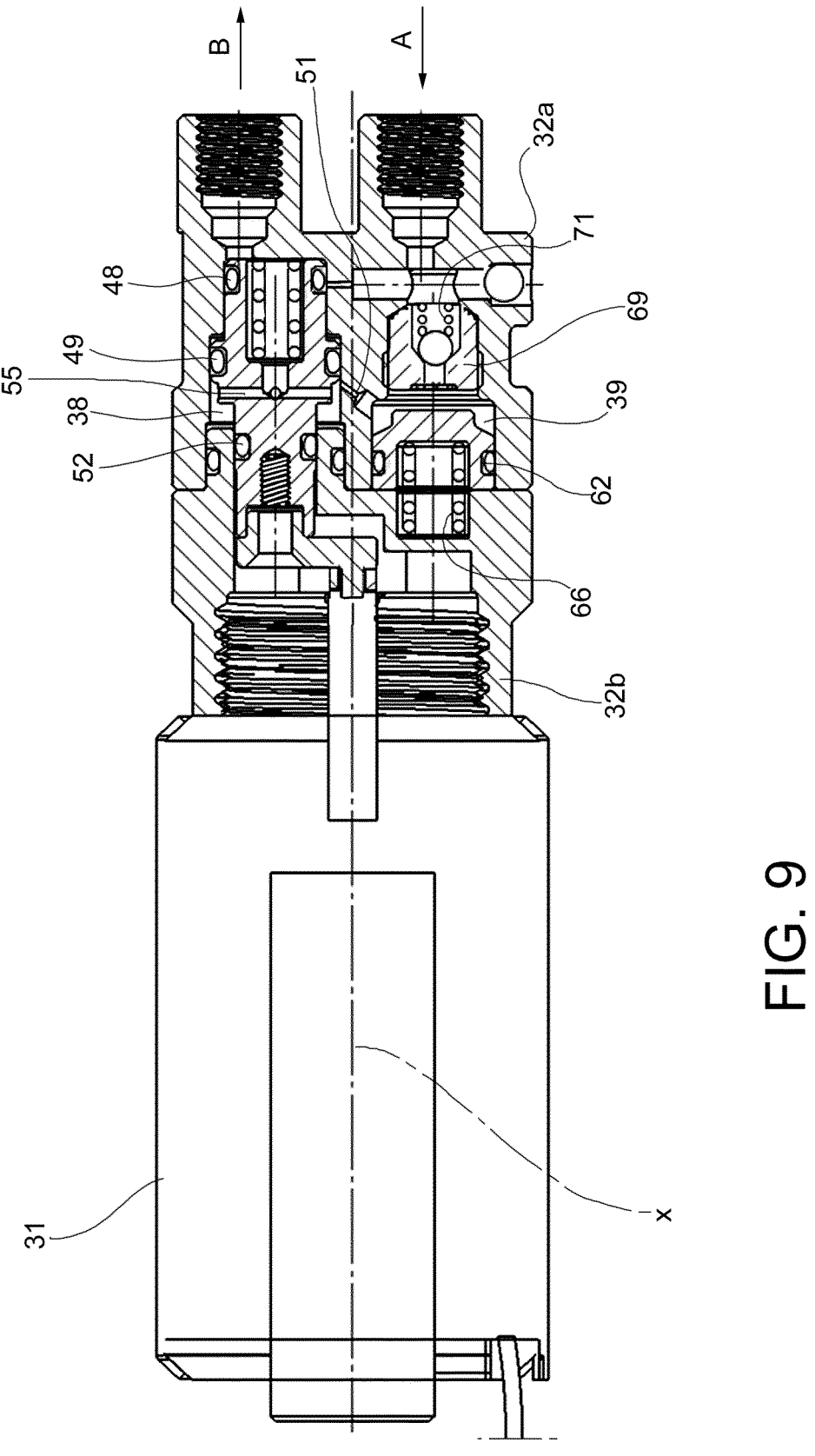
Figure 10:
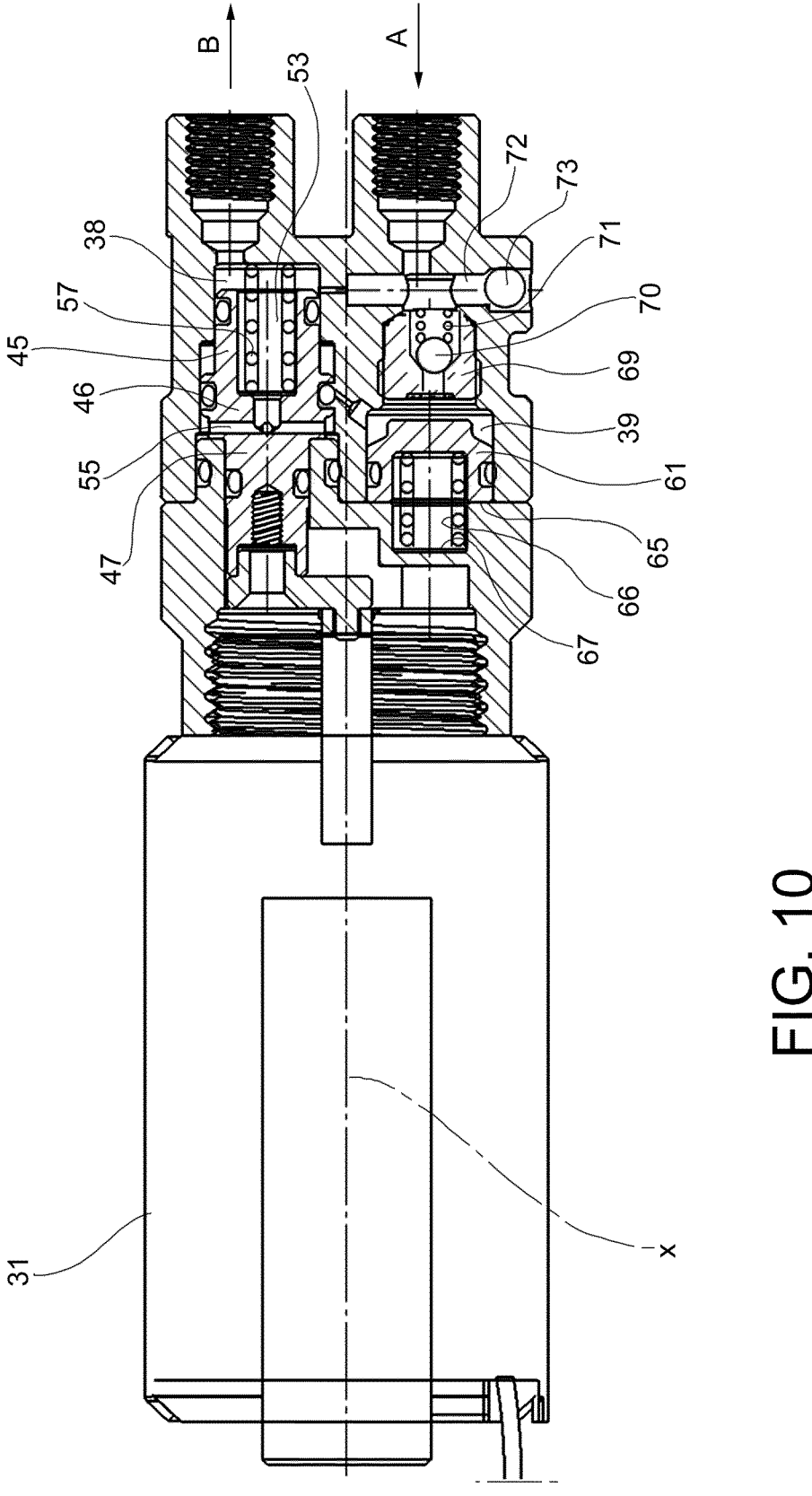
Figure 11:
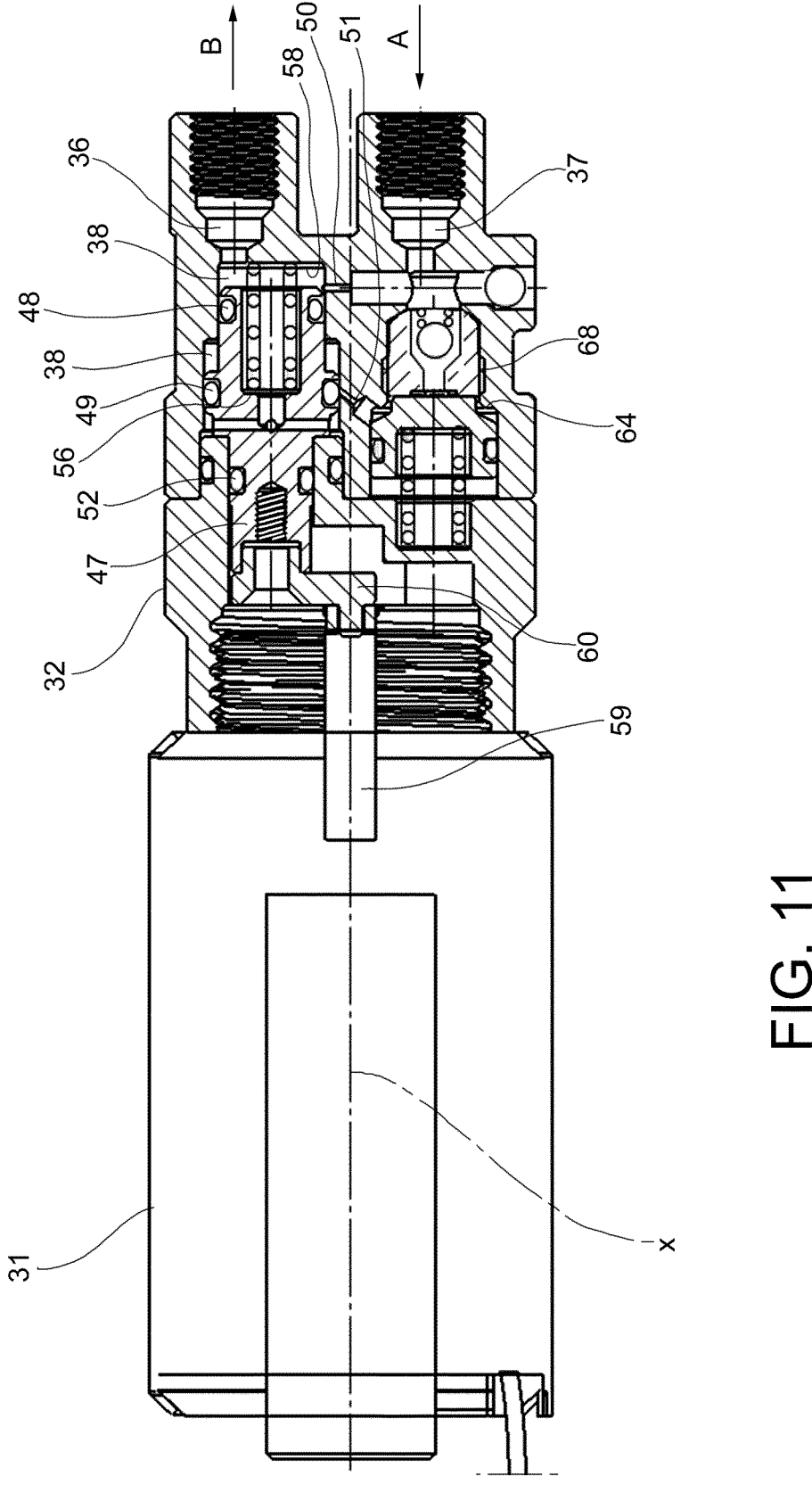

The hydraulic ducts within the ABS unit are connected in such a way as to allow three functional braking states, according to the position of the hand lever and the state of the piston. The hydraulic circuit is connected as shown in FIG. 3. The three possible braking states are as follows: brakes off (FIG. 4), manual braking (FIG. 5), and decreased braking pressure (FIG. 6).

In the "brakes off" condition, the hand lever is not activated, all pressure within the system is allowed to be released by venting fluid to a master cylinder reservoir through the one-way valve (FIG. 4).

In the "manual braking" condition, the hand lever is activated, pressure is passed directly to the brake calliper. The electrical solenoid is not activated. The one-way valve is closed so that hydraulic fluid may not pass from the master cylinder into the accumulator (FIG. 5).

The "decreased braking pressure" condition occurs when the ECU detects that the front wheel starts to skid or the bicycle is at risk of rolling over; the electrical solenoid is actuated and the sliding valve moves against its spring. The fluid within the master cylinder is blocked, and the pressure within the calliper is allowed to escape into the accumulator cylinder, until the pressure within the calliper becomes equal to the pressure generated by the accumulator spring force acting against the accumulator piston (FIG. 6).

During braking on a slippery surface, the ECU detects that the front wheel is slipping and energized the electrical solenoid (the system changes from the manual braking state to the decreased braking pressure state). Once grip has been regained, current to the solenoid is switched off and the system reverts to the manual braking state.

Referring now to the specific exemplary embodiment of FIGS. 7 to 13, numeral 30 designates a valve unit for an anti-lock braking system on the front wheel of a bicycle. The valve unit 30 defines a longitudinal axis x and has an elongated shape in the direction defined here longitudinal or axial. As used herein, terms such as "longitudinal", "transversal", will be construed with respect to the axis x.

The valve unit 30 comprises a linear electric actuator 31, acting in the longitudinal direction designated "B", and a body 32 of plastic material integral with and aligned longitudinally to the electric actuator 31. As in the illustrated example, the electric actuator 31 and the body 32 may be joined by a threaded coupling 33.

The body 32 is variously shaped, in this example it has an overall cylindrical tubular shape, and has one end 34 fixed to the electric actuator and one opposite end 35.

The end 35 of the body 32 forms an outlet port (or delivery port) 36, hydraulically connectable to the brake calliper 14 of the front wheel brake of a bicycle, and an inlet port 37, hydraulically connectable to the master cylinder 12 (FIG. 3), which is operationally associated with the actuation lever on the handlebar of the bicycle.

The body 32 forms a primary hydraulic chamber 38 and an expansion chamber 39, or secondary hydraulic chamber. The primary hydraulic chamber 38 communicates directly with the outlet port 36 and receives a piston 40, operated by the electric actuator 31, in a longitudinally sliding manner. The primary hydraulic chamber 38 forms an end section 42 with diameter D1 (FIG. 13) closer to the outlet port 36, an intermediate section 43 with diameter D2 larger than diameter D1, and a proximal section 44 with diameter D3 smaller than diameter D1, closer to actuator 31.

Piston 40 comprises a terminal portion 45 received in end section 42 of primary chamber 38, an intermediate portion 46 received in intermediate section 43 of primary chamber 38, and a proximal portion 47 received in proximal section 44 of primary chamber 38.

The end portion 45 of the piston 40 is fitted with an end sealing gasket 48 that slidably contacts the end section 42 of the primary chamber 38. The intermediate section 46 is fitted with an intermediate sealing gasket 49 which engages the intermediate section 43 of the primary chamber 38. A proximal sealing gasket 52 is mounted on the proximal portion 47 to engage the proximal section 44 of the primary chamber 38.

Piston 40 forms a longitudinal cavity 53 that extends through the piston between a terminal face 54 of the terminal portion 45 of the piston, facing the outlet port 36, and a transverse passage 55 that opens on a side surface of the piston. Preferably, the transverse passage 55 opens on the intermediate section 43 of the primary hydraulic chamber 38.

Accommodated in the longitudinal through cavity 53 is a primary spring element 57, in this example a compression spring, elastically compressed between a piston shoulder 56 and a transverse wall 58 of the primary hydraulic chamber, adjacent to the outlet port 36. The primary spring element 57 urges the piston 40 towards the actuator 31 (in the direction of arrow A).

For constructional reasons, the piston 40 may be mechanically connected to a longitudinally movable pin 59 of the actuator by means of a connection element 60 which, as in the exemplary embodiment illustrated herein, is substantially Z or L-shaped.

A first bypass passage 50 is formed in the body 32 of the valve unit and opens on the end section 42 of the primary hydraulic chamber 38, putting this chamber in fluid communication with the inlet port 37. An outflow passage 51 is formed in the body 32 of the valve unit and opens on the intermediate section 43 of the primary hydraulic chamber 38, putting this chamber in fluid communication with the expansion chamber 39.

The expansion chamber 39 accommodates a floating valve element 61 having a sealing gasket 62 which engages a cylindrical section 63 of the expansion chamber 39 in a longitudinally sliding manner. The floating valve element 61 is movable within the expansion chamber 39 between a shoulder 64 formed towards the end 35 of the body 32, and a transverse wall 65, arranged towards the actuator 31.

The outflow passage 51 opens on the expansion chamber 39 at a point located longitudinally closer to the inlet port 37. In the illustrated example, the outflow passage 51 opens at one end of the cylindrical section 63 of the expansion chamber 39 closer to the outlet port 36.

A secondary spring element 66, e.g. a compression spring, is elastically compressed between the floating valve element 61 and a transverse wall 67 of the valve body 32. The secondary spring element 66 urges the floating valve element 61 in the direction B towards the end 35 of body 32, therefore towards the inlet port 37. As described herein after, the injection of pressurized brake fluid from the primary chamber 38 into the expansion chamber 39 moves the floating valve element 61 in the direction A, longitudinally away from the end 35 of the body 32, and thus away from the outlet port 36 and the inlet port 37, in contrast to the force of the secondary spring element 66.

The expansion chamber 39 communicates fluid with the inlet port 37 through a channel 68, formed in body 32, in which a one-way valve 69 is mounted between the expansion chamber 39 and the inlet port 37. The one-way valve 69 consists of a sphere 70 and a spring 71, which forces the sphere 70 away from the inlet port 37 to occlude the channel 68. The one-way valve 69 allows brake fluid to flow through it in only one direction, from the expansion chamber 39 to the inlet port 37.

In the illustrated embodiment, a transverse bore 72 is formed in the body 32 for constructional reasons, in order to facilitate the construction of the bypass port 50. The transverse hole 72 is permanently closed by a plug shown schematically at 73.

For constructional reasons, the body 32 can be made up of two or more complementary parts, in this example a main part 32a and a connecting part 32b. The main part 32a forms the primary hydraulic chamber 38, the expansion chamber 39 and the inlet port 37 and outlet port 36. The connecting part 32b is intermediate between the main part 32a, to which it is hermetically sealed, and the actuator body 31, to which it is joined by means of a coupling, in this example the threaded coupling 33.

Under normal braking conditions, i.e. when the bicycle is braking but the front wheel is not locked and therefore not skidding, the electric actuator 31 is not energized. The primary spring 57 in the primary hydraulic chamber 38 urges the piston 40 (to the left) into a retracted position or position 0, keeping the bypass passage 50 free, which allows the direct passage of the brake fluid from the inlet port 37 to the outlet port 36. The anti-lock braking system is not active. In the retracted position of the piston, the second seal 49 occludes the outflow passage 51 between the primary chamber 38 and the expansion chamber 39.

The brake fluid fills the primary chamber 38, both in the end section 42 and in the intermediate section 43, due to the longitudinal through cavity 53.

When the actuator 31 is energized (FIG. 8), piston 40 is moved towards the outlet port 36 (to the right, direction B), compressing the primary spring 57. The seal 48 closes the bypass port 50, so that the flow of brake fluid from the master cylinder to the brake calliper through the valve unit is interrupted. Piston 40 moves away from actuator 31 to an extended position where the outflow passage 51 between primary chamber 38 and expansion chamber 39 is opened, so that the brake fluid flows from the primary chamber to the expansion chamber.

The brake fluid pressure entering the expansion chamber 39 pushes the floating valve element 61 towards the actuator (to the left, direction A), overcoming the elastic force of the secondary spring 66. The volume of expansion chamber 39 then increases and, as a result, the brake fluid pressure in the primary chamber 38 is reduced instantaneously. Due to the longitudinal through cavity 53 in piston 40, the pressure drop in the primary chamber also simultaneously reduces the brake fluid pressure downstream of the outlet port 36 in the pipe leading to the front brake calliper. The front brake calliper is therefore released, unlocking the front wheel.

When the front wheel unlocks, the electronic control unit interrupts the energization of the actuator solenoid 31, so that the primary spring 57 can extend and bring piston 40 closer to actuator 31, thus reopening the bypass passage 50 and closing the outflow passage 51. As a result, the master cylinder is again in fluid communication with the front brake calliper.

Figure 12:
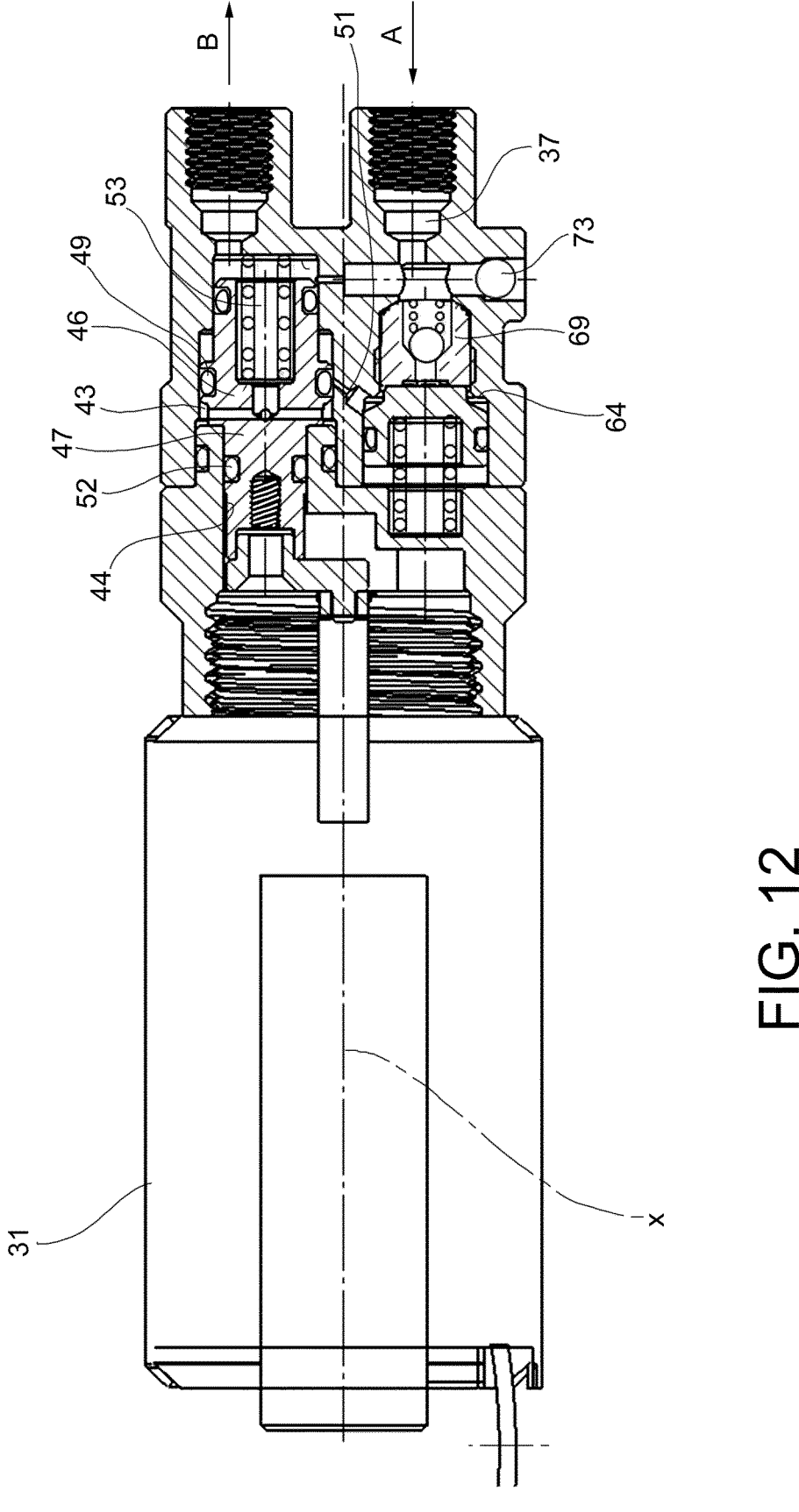

When the bypass hole 50 is reopened, the expansion chamber 39 (FIG. 10) is still contains an amount of brake fluid because he floating valve element 61 has moved in the direction A and is abutting against the transverse wall 65. The volume of brake fluid contained in expansion chamber 39 must be fed back into the hydraulic circuit so that the brake lever can return to its initial rest position. As the pressure in the hydraulic circuit has dropped, the secondary spring 66 can extend and move the floating valve element 61 towards the inlet port 37 (direction B), essentially emptying the expansion chamber 39 (FIG. 11) and reintroducing the brake fluid into the hydraulic circuit. The emptying of the expansion chamber 39 is made possible by the one-way valve 69, which closes automatically thanks to the action of the spring 71 associated with the sphere 70 (FIG. 12).

Figure 13:
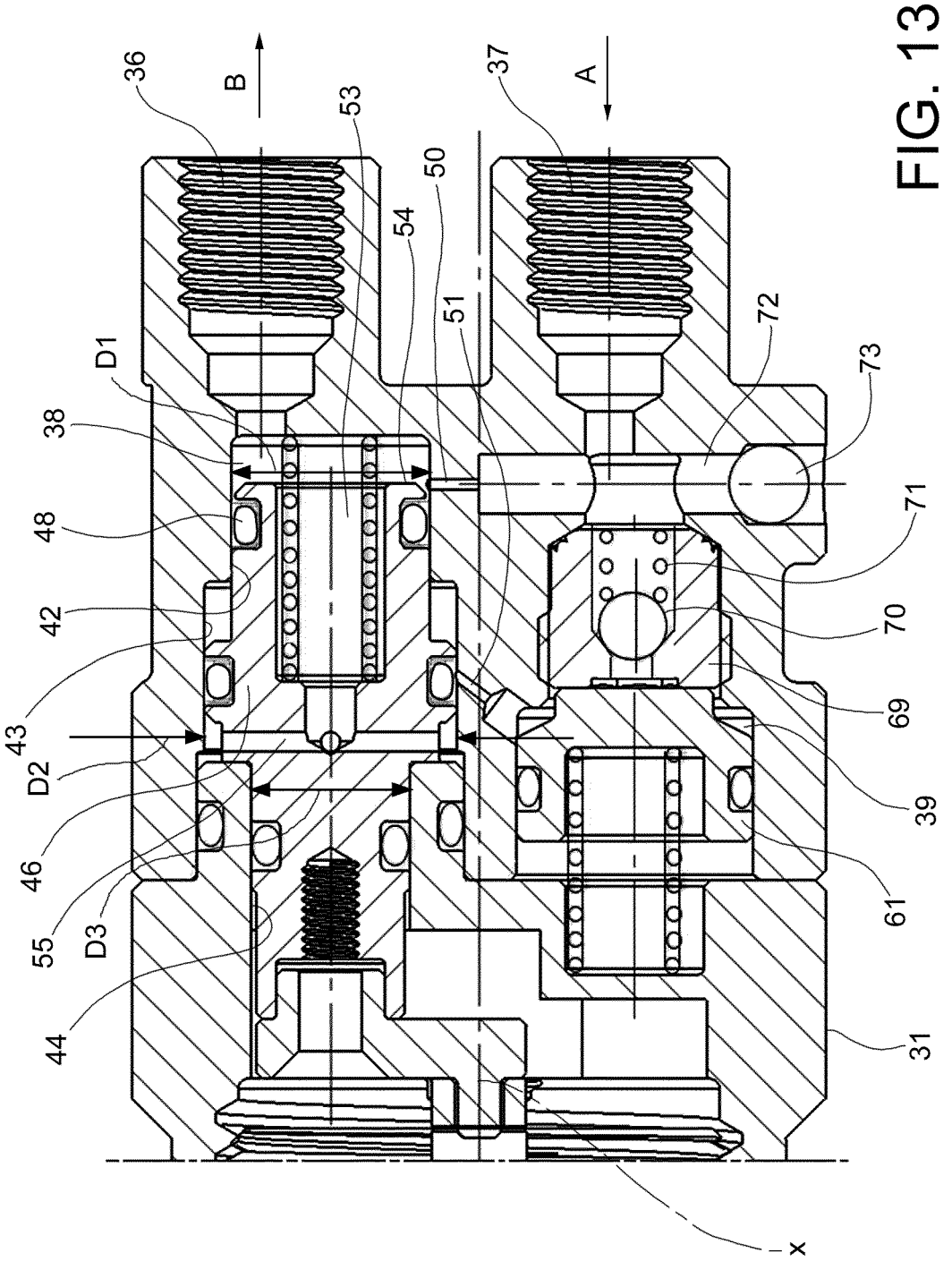

With reference to FIG. 13, in the primary chamber 38 the area of the circle having diameter D1, delimited by the seal 48, can advantageously be equivalent to the area of an annulus defined by diameters D2 and D3 on which the sliding seals 49 and 52 act. Consequently, the longitudinal thrust exerted by the hydraulic pressure of the brake fluid acting on piston 40 in the end section 42 of the primary chamber (from the side of the delivery bore 36) is equal or substantially equal to the hydraulic thrust acting on the same piston 40 in the intermediate section 43 of the primary chamber (from the part closest to the actuator 31). Therefore, the two opposite longitudinal thrusts, equal and opposite, compensate each other, so that the actuator is required to exert a small longitudinal force to cause the displacement of piston 40. Due to the above arrangement, the solenoid 31 may be small, since it is required to provide a moderate axial thrust to the piston in order to move it and overcome only the elastic reaction of the primary spring element 57.

While specific embodiments of the invention have been disclosed, it is to be understood that such disclosure has been merely for the purpose of illustration and that the invention is not to be limited in any manner thereby. Various modifications will be apparent to those skilled in the art in view of the foregoing examples. The scope of the invention is to be limited only by the appended claims.

The invention claimed is:

1. An anti-lock braking unit for a hydraulic braking system, particularly of a bicycle, the anti-lock braking unit comprising:

a single actuating solenoid electrically connectable to an electronic control unit (ECU) which monitors rotational speed of wheels and is capable of detecting a condition indicative of impending lock of a wheel and providing a control signal to energize the actuating solenoid;

a single valve unit, comprising
a valve body with
an outlet port hydraulically connectable to a brake calliper,
an inlet port hydraulically connectable to a master cylinder,
a primary hydraulic chamber in fluid communication with the outlet port,
an expansion chamber with an outflow passage establishing fluid communication between the primary hydraulic chamber and the expansion chamber,
a bypass passage establishing fluid communication between the inlet port and the outlet port; and
a piston longitudinally movable in response to energization of the actuating solenoid and slidably accommodated in the primary hydraulic chamber;

the piston having two alternative operational positions:

a first position, in which the actuating solenoid is deenergized and the piston occludes the outflow passage while not occluding the bypass passage, and a second position, in which the piston is moved along the primary hydraulic chamber in response to energization of the actuating solenoid, and in which the piston occludes the bypass passage while not occluding the outflow passage.

2. The anti-lock braking unit according to of claim 1, wherein the piston forms a longitudinal through cavity that extends through the piston between a terminal face of a terminal portion of the piston, facing the outlet port, and a transverse passage that opens on a side surface of the piston.

3. The anti-lock braking unit of claim 1, wherein the primary hydraulic chamber forms a first section, a second section, and a third section, and wherein:

the first section is an end section having a first diameter and being located closer to the outlet port, the third section is a section farthest from the outlet port and has a third diameter smaller than the first diameter, and the second section, is a section intermediate the end section and the third section, the second section having a second diameter larger than the first diameter.

4. The anti-lock braking unit of claim 3, wherein the piston comprises a terminal portion received in the first section of the primary hydraulic chamber, an intermediate portion received in the second section of the primary hydraulic chamber, and a third portion received in the third section of the primary hydraulic chamber.

5. The anti-lock braking unit of claim 3, wherein a circle with a diameter corresponding to the first diameter has an area equivalent to an area of an annulus having an outer circle with a diameter corresponding to the second diameter and an inner circle with a diameter corresponding to the third diameter, whereby a longitudinal thrust exerted by a hydraulic pressure of a brake fluid acting on the piston in the first section of the primary hydraulic chamber is substantially equal to the longitudinal thrust exerted by the hydraulic pressure of the brake fluid acting on the piston in the second section of the primary hydraulic chamber.

6. The anti-lock braking unit of claim 1, wherein a primary spring element is elastically compressed between the piston and a transverse wall of the primary hydraulic chamber located adjacent to the outlet port.

7. The anti-lock braking unit of claim 6, wherein the piston forms a longitudinal through cavity that extends through the piston between a terminal face of a terminal portion of the piston, facing the outlet port, and a transverse passage that opens on a side surface of the piston and wherein the primary spring element is at least partially accommodated in the longitudinal through cavity, elastically compressed between a shoulder of the piston and said transverse wall of the primary hydraulic chamber.

8. The anti-lock braking unit of claim 1, wherein the expansion chamber accommodates a longitudinally slidable floating valve element and a secondary spring element urging the longitudinally slidable floating valve element towards the inlet port, and wherein the expansion chamber fluidly communicates with the inlet port through a channel, in which there is mounted a one-way valve allowing a brake fluid to flow through the one-way valve in only one direction, from the expansion chamber to the inlet port.

9. The anti-lock braking unit of claim 8, wherein the longitudinally slidable floating valve element is movable within the expansion chamber between a shoulder of the valve body arranged in the expansion chamber closer to the inlet port and a transverse wall, arranged in the expansion chamber farther to the inlet port, and wherein the outflow passage opens on the expansion chamber at a location longitudinally adjacent the shoulder.

10. A valve unit, comprising:

a valve body with an outlet port hydraulically connectable to a brake calliper, an inlet port hydraulically connectable to a master cylinder, a primary hydraulic chamber in fluid communication with the outlet port, an expansion chamber with an outflow passage establishing fluid communication between the primary hydraulic chamber and the expansion chamber, a bypass passage establishing fluid communication between the inlet port and the outlet port; and a piston longitudinally movable and slidably accommodated at least partially in the primary hydraulic chamber;

the piston having two alternative operational positions:

a first position, in which the piston occludes the outflow passage while not occluding the bypass passage, and a second position, in which the piston is moved along the primary hydraulic chamber and occludes the bypass passage while not occluding the outflow passage.

* * * * *